(12) United States Patent
Kyung et al.

(10) Patent No.: US 7,408,917 B1
(45) Date of Patent: Aug. 5, 2008

(54) ENABLING MOBILE STATIONS OF MULTIPLE CONFIGURATIONS TO SYNC TO A CDMA SYSTEM BASED ON MULTIPLE PROTOCOL IDENTIFIERS ON MULTIPLE CHANNELS

(75) Inventors: Chanho Kyung, San Diego, CA (US); Byung K. Yi, San Diego, CA (US); Namsoo Park, San Diego, CA (US); Heejoung Lee, San Diego, CA (US); Hyeon Ho Jeong, Tenafly, NJ (US); Jong Hoe An, Seoul (KR); Young Jo Lee, Kun-po-shi (KR)

(73) Assignee: LG Infocomm USA, Inc., San Diego, CA (US)

( * ) Notice: Subject to any disclaimer, the term of this patent is extended or adjusted under 35 U.S.C. 154(b) by 1218 days.

(21) Appl. No.: 10/357,361

(22) Filed: Feb. 4, 2003

Related U.S. Application Data

(60) Provisional application No. 60/355,836, filed on Feb. 13, 2002, provisional application No. 60/358,389, filed on Feb. 22, 2002.

(51) Int. Cl.
*H04J 3/06* (2006.01)
(52) U.S. Cl. .................. 370/350; 370/342; 370/345
(58) Field of Classification Search .............. 370/335, 370/342, 350, 510, 522; 455/414, 420, 552
See application file for complete search history.

(56) References Cited

U.S. PATENT DOCUMENTS

| | | | |
|---|---|---|---|
| 5,892,802 A * | 4/1999 | Jung et al. ................. 375/354 |
| 6,005,854 A * | 12/1999 | Xu et al. ..................... 370/335 |
| 6,154,500 A * | 11/2000 | Dorenbosch et al. ........ 375/259 |
| 6,298,054 B1 * | 10/2001 | Dorenbosch et al. ........ 370/350 |
| 6,363,242 B1 * | 3/2002 | Brown et al. .................. 455/70 |
| 6,389,298 B1 * | 5/2002 | Abramovici et al. ..... 455/552.1 |
| 6,970,447 B2 * | 11/2005 | Burgess et al. .............. 370/342 |
| 2001/0034233 A1 * | 10/2001 | Tiedemann et al. ......... 455/436 |
| 2002/0159416 A1 * | 10/2002 | Kazmi et al. ................ 370/335 |
| 2003/0161283 A1 * | 8/2003 | Tiedemann et al. ......... 370/329 |
| 2003/0211847 A1 * | 11/2003 | Jang et al. ................... 455/434 |
| 2004/0203702 A1 * | 10/2004 | Burgess et al. ........... 455/422.1 |
| 2004/0236849 A1 * | 11/2004 | Cooper et al. ............... 709/224 |
| 2006/0003801 A1 * | 1/2006 | Hattori ..................... 455/552.1 |
| 2006/0079224 A1 * | 4/2006 | Welnick et al. .......... 455/432.1 |
| 2007/0047580 A1 * | 3/2007 | Sachs et al. ................. 370/469 |
| 2007/0104178 A1 * | 5/2007 | Park et al. ................... 370/350 |

OTHER PUBLICATIONS

Wang, et al., 1S2000 Sync Channel Issue, Sync Channel Workaround Solutions, 3GPP2 Discussion, Nov. 1, 2001, pp. 1-15.*

* cited by examiner

*Primary Examiner*—Firmin Backer
*Assistant Examiner*—Abdullah Riyami
(74) *Attorney, Agent, or Firm*—Manelli Denison & Selter PLLC; Leon R. Turkevich

(57) ABSTRACT

An IS-2000 Rev. A base station enables synchronization of a mobile station configured for receiving, via a sync channel, a sync channel message, based on sending a first sync channel message on the sync channel specifying a first protocol (P_REV=5), and sending a second sync channel message (ESPM) on a common channel (PCH) specifying a second protocol (P_REV=7), enabling the mobile station to synchronize according to one of the first and second protocols based on decoding a corresponding one of the first and second sync channel messages.

12 Claims, 6 Drawing Sheets

ENABLING MOBILE STATIONS OF MULTIPLE CONFIGURATIONS TO SYNC TO A CDMA SYSTEM BASED ON MULTIPLE PROTOCOL IDENTIFIERS ON MULTIPLE CHANNELS

This application claims the benefit of priority from U.S. Provisional Application No. 60/355,836, filed Feb. 13, 2002, and U.S. Provisional Application No. 60/358,389, filed Feb. 22, 2002.

BACKGROUND OF THE INVENTION

1. Field of the Invention

This invention generally relates to transmission of Sync Channel Messages in digital wireless mobile communications systems. In particular, the present invention relates to operation of Sync Channel Messages transmitted by a base station according to an Interim Standard (IS-2000) Rev. A System, to multiple-configured mobile stations, including IS-95 Mobile Stations, and IS-2000 Rev. A Mobile and beyond

2. Background Art

The first global standards for Code Division Multiple Access (CDMA) systems are TIA/EIA IS95 standards that were published by Telecommunications Industry Association (TIA) in 1993. Since then, the standards have been improved and evolved, which can be distinguished by their protocol revision number (P_REV). For example, the P_REV of IS95-B standard with all required features is P_REV=5 and that of IS-2000 Revision 0 standards is P_REV=6. Also, the IS-2000 Revision A standards has a P_REV value of P_REV=7 and the most recent version of CDMA specification, that is IS-2000 Revision C, has P_REV=10.

FIG. 1 is a diagram illustrating mobile station (MS) states as a CDMA mobile station is powered on. The MS first enters a Mobile Station Initialization State (100) having four sub-states, namely a System Determination Substate 101, a Pilot Acquisition Substate 102, a Sync Channel Acquisition Substate 103, and Timing Change Substate 104. In the System Determination Substate 101, the MS selects the system to lock on and then the MS acquires pilot channel in step 102 and sync channel in step 103. After the MS correctly receives the Sync Channel Message (SCHM) in step 103, the MS synchronizes its long code timing and system timing to those of the CDMA system during the Timing Change Substate 104. The MS then enters the Mobile Station Idle State 110 in which the MS is monitoring the overhead message and paging message from the Base Station (BS).

The evolution of CDMA system has resulted in the redistribution of messages throughout different channels. For example, the overhead and paging messages in the IS95-B systems and IS-2000 Rev. 0 systems are sent on the Paging Channel (PCH), one of the physical channels sent from the BS. The IS-2000 Rev. A systems, however, added the Forward Common Control Channel (F-CCCH) and Broadcast Control Channel (BCCH) to enhance the performance; hence, in the IS-2000 Rev. A Systems, the paging messages are sent on the F-CCCH and overhead messages are sent on the BCCH.

The differences between the IS-95B, IS-2000 Rev. 0 and IS-2000 Rev. A systems are summarized in Table 1:

TABLE 1

| (Channel) | IS-95B | IS-2000 Rev. 0 | IS-2000 Rev. A |
|---|---|---|---|
| SCHM | P_REV = 5 Message Length < 28 Octet | P_REV = 6 Message Length = 28 Octet 11-bit (EXT_CDMA_FREQ field newly added) | P_REV = 7 Message Length >= 28 Octet Added message fields contain BCCH info. |
| Paging Channel | Used to send paging and overhead messages P_REV = 5 in the ESPM | Used to send paging and overhead messages | [Used only to send paging and overhead messages for backward compatibility of older MSs; paging channel functions moved to BCCH/F-CCCH] |
| BCCH/ F-CCCH | N/A | N/A | BCCH used to send overhead message F-CCCH used to send paging message |

The paging channel is no longer used in IS-2000 Rev. A systems except when older-version of MSs (e.g. IS-95B or IS-2000 Rev. 0) are present in the Rev. A system.

To support the BCCH, the Sync Channel Message (SCHM) of IS-2000 Rev. A systems was extended by additional fields that contain the various information regarding the BCCH, such as Code Rate of BCCH, Data Rate of BCCH, Transmit Diversity of BCCH, etc.

The length of Sync Channel Message (SCHM) in IS95-B system is 27 Octets. But in IS-2000 Rev. 0 system, the 11-bit EXT_CDMA FREQ field was added to the SCHM and the length of SCHM was extended to 28 Octets, which caused some of IS-95 Legacy Mobile Stations (MS) from some particular manufacturers, especially from Nokia and Motorola, having difficulty to recognize the extended SCHM. The IS-95 MSs from Motorola and Nokia reliably obtain the SCHM only when the length of SCHM is same as that of IS-95B SCHM (27 octets).

A solution to the problem of reliably obtaining the SCHM, named the "IS-2000 Rev. 0 Workaround Solution", was proposed and adopted as a method to solve this problem without changing any standards. The IS-2000 Revision 0 Base Station (BS) sets P_EV value in the SCHM to '5' and later, the BS lets the MS know the "true P_REV" which is '6' through the Extended System Parameters Message (ESPM) that is sent in the Paging Channel. The ESPM is one of the overhead messages that is sent through Paging Channel to give the MS parameters regarding the corresponding System. The EXT_CDMA_FREQ message can be specified in the CDMA_FREQ field that is sent in the Extended CDMA Channel List Message (ECCLM) which is also sent in the Paging Channel. The ECCLM is another one of the overhead messages sent through Paging Channel to give the MS information regarding the frequencies that the BS uses.

FIGS. 2A, 2B, and 2C are diagrams illustrating IS-2000 Mobile Station responses to different wireless systems. The IS-2000 Revision 0 Workaround Solution was made possible without changing any standards because there was a CDMA_FREQ field in the ECCLM. FIG. 2A illustrates the normal operation of an IS-2000 Rev. 0 MS within an IS-2000 Rev. 0 system: the MS receives in step 112 the SCHM having a P_REV=6; the MS changes in step 114 the frequency specified in the EXT_CDMA_FREQ field in the SCHM message, obtains the paging channel, and enters its idle state.

FIG. 2B illustrates an IS-2000 Rev. 0 MS within an IS-2000 Rev. 0 system, where the system uses the IS-2000 Rev. 0 Workaround Solution. The MS receives in step 116 a SCHM having a P_REV=5, with no EXT_CDMA_FREQ field included in the SCHM. The MS receives in step 118 the paging channel at the same frequency as the SCHM in step 118. The MS determines in step 119 that the true P_REV is P_REV=6 from the ESPM sent on the paging channel. The MS changes in step 120 the frequency specified by the CDMA_FREQ field in the ECCLM of the paging channel, and enters its idle state. The workaround solution causes some delay while the MS gets the paging channel, however, the MS can get the frequency information.

FIG. 2C illustrates normal operation of an IS-2000 Rev. A MS located within an IS-2000 Rev. A system. In this case, more parameter fields were added to the SCHM to support the Broadcast Control Channel (BCCH). The MS obtains in step 122 the SCHM specifying the P_REV=7, and changes in step 124 the frequency specified by the SCHM and obtains the BCCH. The MS then enters its idle state. Note that in the IS-2000 Rev. A system, no new messages are added to the paging channel that contain information on BCCH. The new parameters are sent only in the SCHM. Hence, if the IS-2000 Rev. A BS sends the SCHM with P_REV set to 5, the problem MS from Motorola and Nokia will work well but the IS-2000 Rev. A MS cannot get information related to BCCH from anywhere. If the IS-2000 Rev. A BS sends the SCHM with P_REV set to 7, the problem MSs will not work since they cannot get the SCHM with the length beyond 28 Octets.

The detailed symptoms of problem MSs are as follows:

Nokia IS95 MS: FIG. 3 illustrates the structure of the Sync Channel super frame. The Sync Channel super frame 132 has 3 Sync Channel frames 130. Nokia IS95 MSs were made to add two frames to the received SCHM to estimate the super frame boundary since the length of IS95 SCHM is composed of 7 Sync Channel frames. Hence, the Nokia MSs can align the super frame boundary correctly only when the length of SCHM is (3n+1) frames, where n is an integer greater than 0.

Motorola IS95 MSs are made to reject the SCHM of which the length is greater than 32 Octets. When the length of SCHM is greater than 28 octets, some of the Motorola IS95 MSs go through some delay before they gets the SCHM correctly, the reason of which is unknown. (28 Octet problem).

However, the proposed "IS-2000 Rev. 0 Workaround Solution" would require an additional change in the existing Wireless Specifications IS-2000 Rev. 0 and IS-2000 Rev. A Such a change in the existing Wireless Specifications would adversely affect deployment of newer wireless standards due to the risk of ad hoc changes to the specifications destabilizing design work according to specifications that were considered completed.

SUMMARY OF THE INVENTION

There is a need for an arrangement that enables older mobile stations to reliably receive sync channel messages within newer wireless CDMA communications systems having Base Stations configured for transmitting sync channel messages according to newer CDMA protocols, without the need for modifying existing standards.

These and other needs are attained by the present invention, where a base station enables synchronization of a mobile station configured for receiving, via a sync channel, a sync channel message, based on sending a first sync channel message on the sync channel according to a first protocol, and sending a second sync channel message on a common channel according to a second protocol, enabling the mobile station to synchronize according to one of the first and second protocols based on decoding a corresponding one of the first and second sync channel messages.

One aspect of the present invention provides a method in a base station of synchronizing a mobile station configured for receiving, via a sync channel, a sync channel message. The method includes first sending on the sync channel a first sync channel message specifying a first protocol. The method also includes second sending on a common channel a second sync channel message specifying a second protocol, enabling the mobile station to synchronize according to one of the first and second protocols based on decoding a corresponding one of the first and second sync channel messages.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment provides a solution that requires no change in the IS-2000 Rev. A specification for the IS-2000 Rev. A Sync Channel problem especially when there is only one Frequency Assignment (FA) available.

Figure 1:
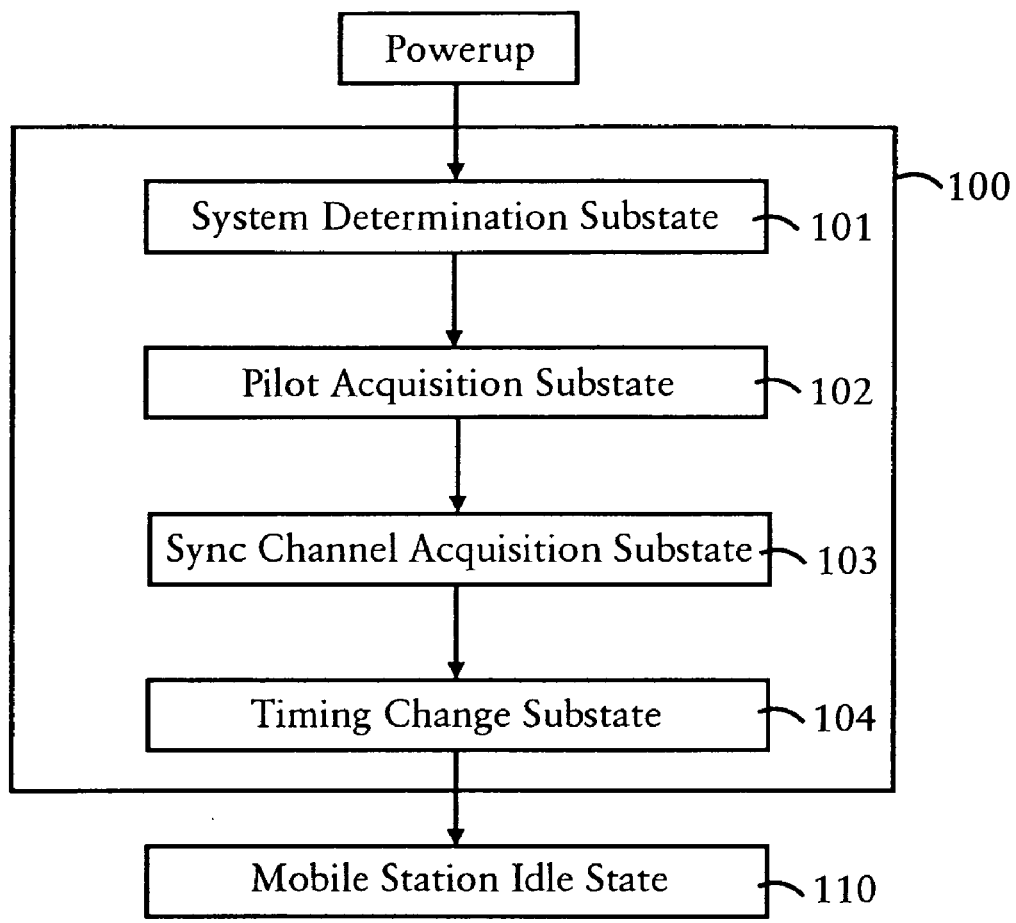
FIG. 1 is a (PRIOR ART) diagram illustrating an initialization sequence for a mobile station.
Figure 2A:
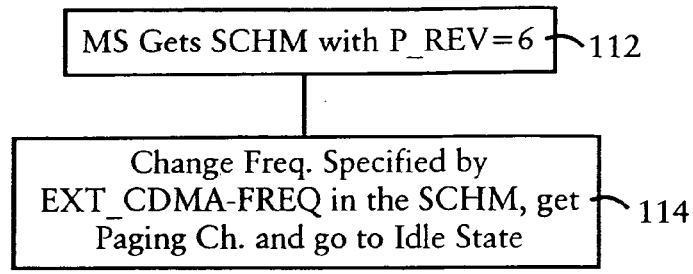
FIGS. 2A, 2B, and 2C are (PRIOR ART) diagrams illustrating respective examples of mobile stations of different CDMA configurations acquiring a sync channel in different CDMA systems.
Figure 2B:
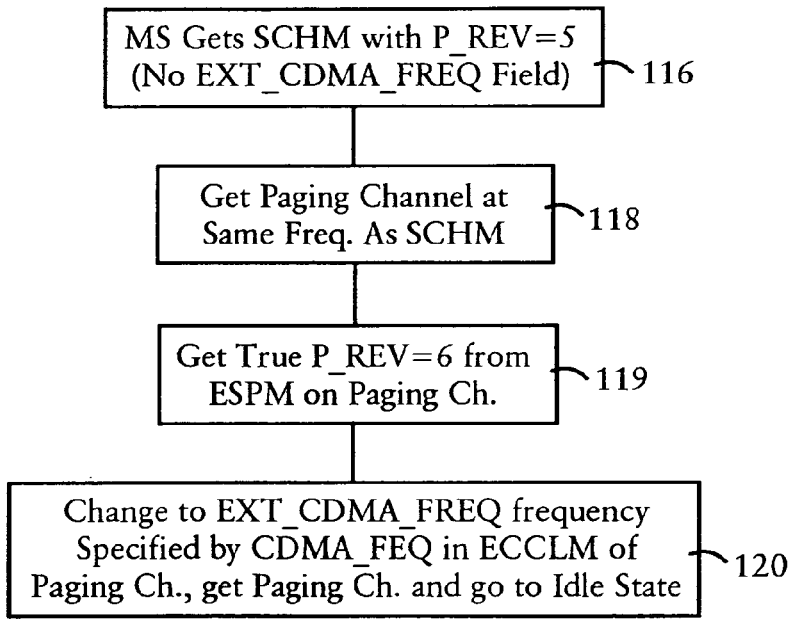
Figure 2C:
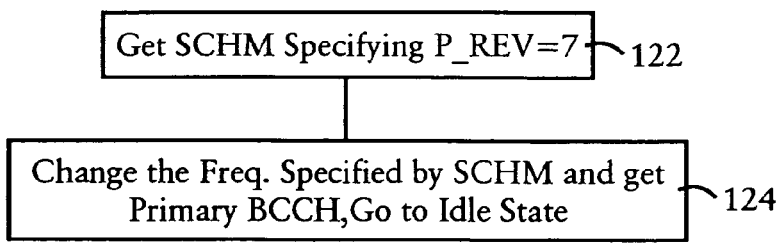
Figure 3:
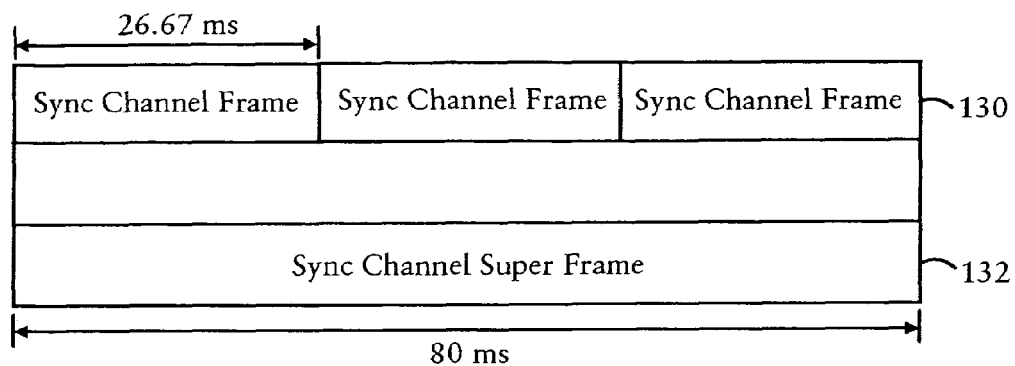
FIG. 3 is a diagram illustrating a (PRIOR ART) sync channel superframe.
Figure 4:
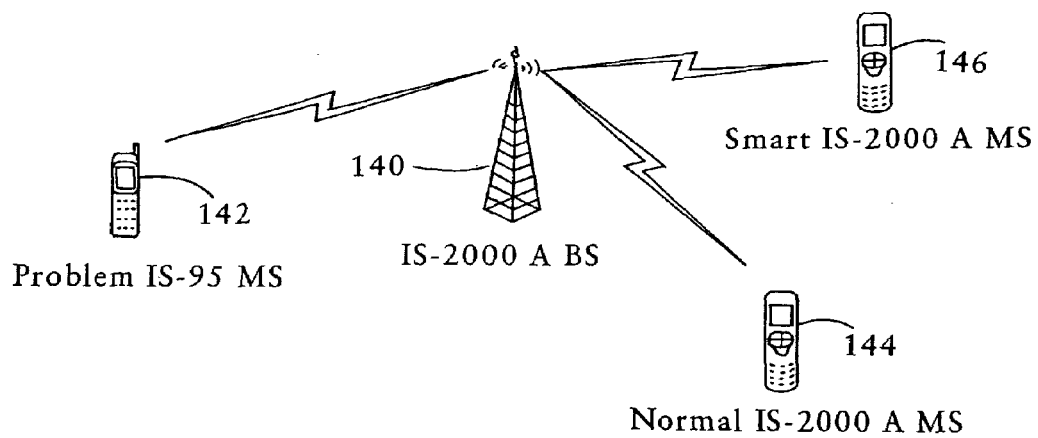
FIG. 4 is a diagram of an IS-2000 Rev. A Base Station configured for sending multiple protocol identifiers for different mobile stations having respective configurations, according to an embodiment of the present invention.

FIG. 4 is a diagram illustrating a CDMA system 140 configured for supplying sync channel messages on multiple channels, enabling MSs having respective configurations to receive a sync channel message, according to an embodiment of the present invention. In particular, the CDMA system 140, configured for sending messages according to IS-2000 Rev. A, sends a sync channel message having a SCHM with P_REV=5, and sets the P_REV value to P_REV=7 in the Extended System Parameters Message (ESPM) that is sent on the paging channel (PCH).

Hence, a legacy mobile station 142 (e.g., a "problem IS-95 MS") is able to acquire the sync channel. In addition, newer mobile stations, for example an IS-2000 Rev. A configured MS 144 or a "smart" IS-2000 Rev. A MS (described below) can acquire the sync channel and utilize the advanced features provided by the IS-2000 Rev. A system 140, including using the BCCH and F-CCCH.

Figure 5:
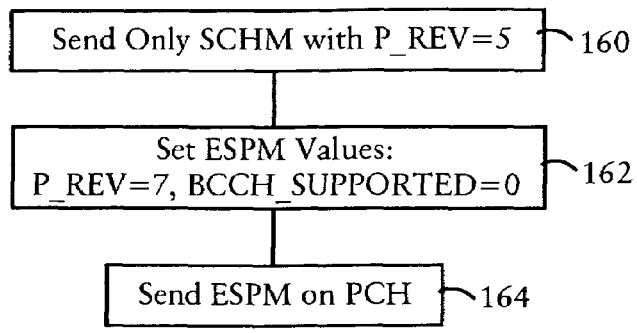
FIG. 5 is a diagram of the method by the Base Station of FIG. 4 sending multiple protocol identifiers according to one embodiment of the present invention.

FIG. 5 is a flow diagram illustrating a first method by the base station 140 of enabling multiply configured mobile stations 142, 144, and 146 to acquire the sync channel, according to an embodiment of the present invention. The IS-2000 Rev. A Base Station 140 sends only the SCHM with P_REV=5 in step 160. The BS 140 sets in step 162 the P_REV to P_REV=7 in the Extended System Parameters Message (ESPM), and the BCCH_SUPPORTED field in the ESPM to '0'. The Base Station 140 outputs the ESPM having the P_REV=7 and the BCCH_SUPPORTED=0 fields in step 164.

The result of the output SCHM as specified in step 160 and the ESPM as specified in step 164 is that both the IS-95 problem MS 142 and IS-2000 Rev. A MSs 144 and 146 will work (i.e., establish communications with the base station 140, although the IS-2000 Rev. A MSs 144 and 146 will consequently operate only in the IS-95 mode. That is, the IS-2000 Rev. A MS gets paging and overhead messages from the Paging Channel instead of getting them from F-CCCH/BCCH.

Figure 7:
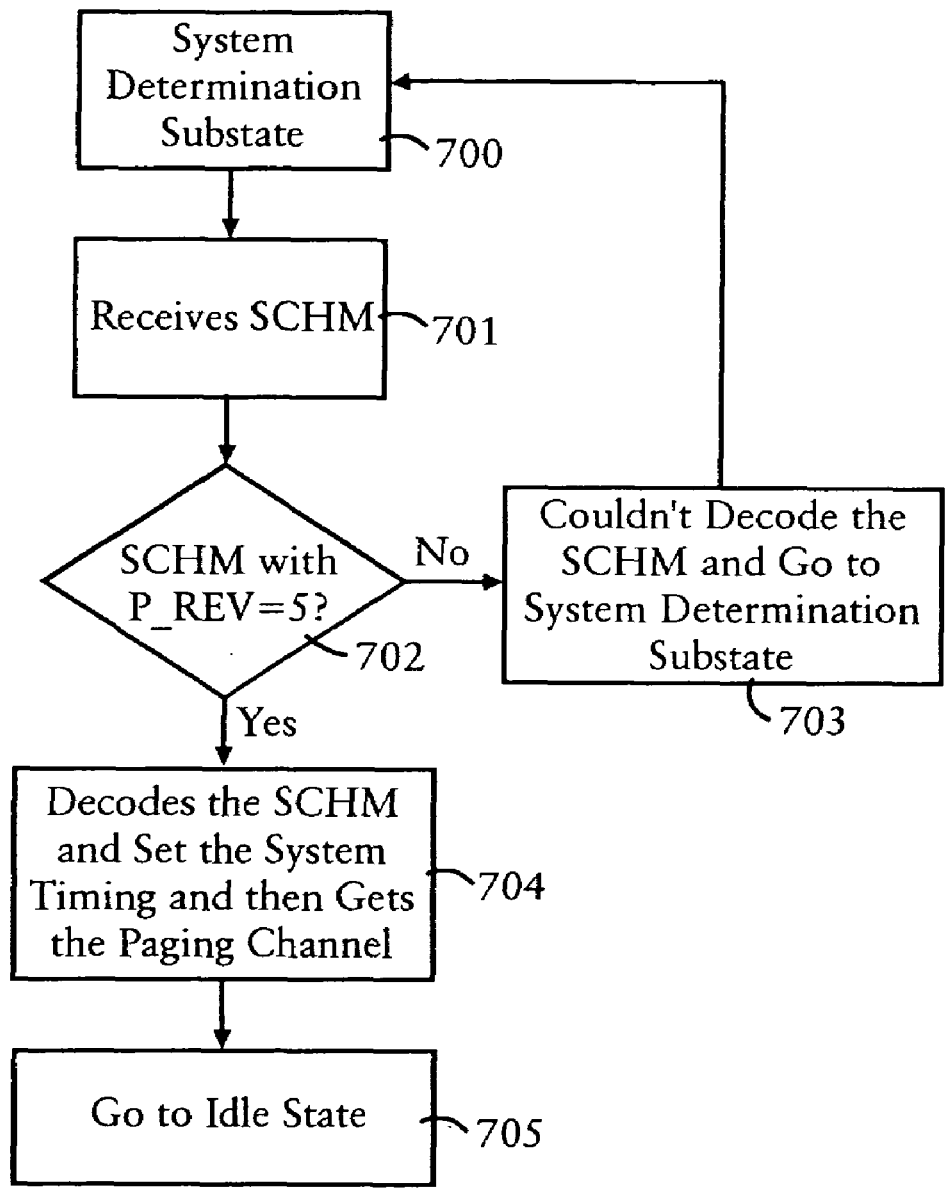
FIG. 7 is a diagram illustrating operation of a conventional IS-95 mobile station within the system of FIG. 4.

FIG. 7 is a diagram illustrating the method for the problem IS-95 MS 142 synchronizing with the base station 140 having sent the SCHM and ESPM as specified in FIG. 5. The MS 142 determines in step 700 the system substate, and receives in step 701 the SCHM having the P_REV set to 5; since in step 702 the MS 142 determines the P_REV is set to P_REV=5, the MS 142 has no problem receiving the SCHM and the PCH in step 704.

Figure 8:
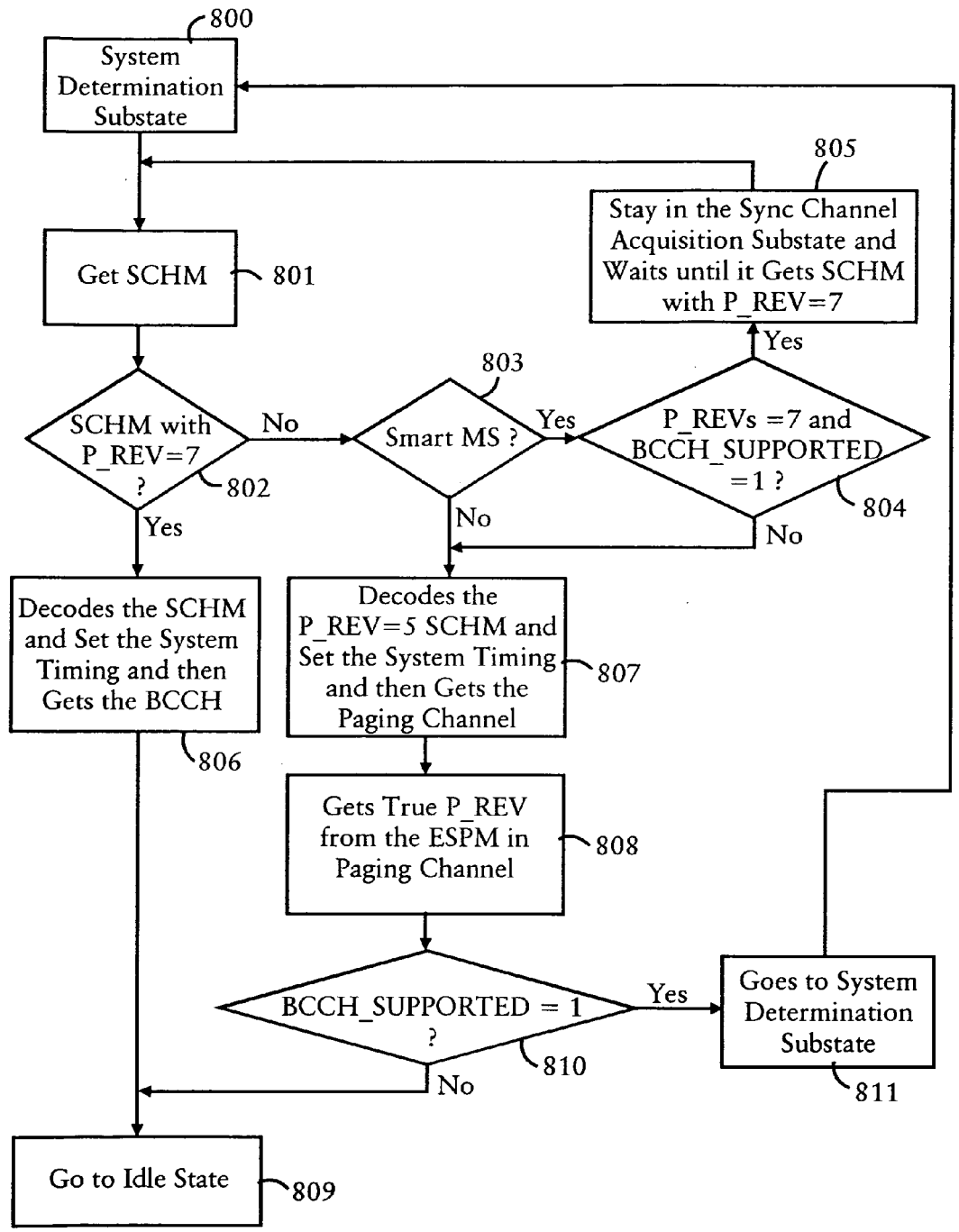
FIG. 8 is a diagram illustrating operations of an IS-2000 Rev. A Mobile Station within the system of FIG. 4.

FIG. 8 illustrates the method for the IS-2000 Rev. A MSs 144 and 146 of acquiring the sync channel. After the system determination substate in step 800, the IS-2000 Rev. A MS 144 or 146 receives in step 801 the SCHM. If in step 802 the MS 144 or 146 determines that the P_REV=5, the MS 144 will perform step 807 and the smart MS 146 will perform step 804. In particular, the MS 144 will decode in step 807 the PCH as if it was in an IS-95B system. After decoding in step 807 the PCH, the MS 144 will obtain in step 808 the true P_REV=7 from the ESPM in the paging channel. If in step 810 the BCCH_SUPPORTED field is set to 0 from the ESPM, indicating the IS-2000 Rev. A system 140 does not support the BCCH, the MS 144 will go to Idle State in step 809.

Figure 6:
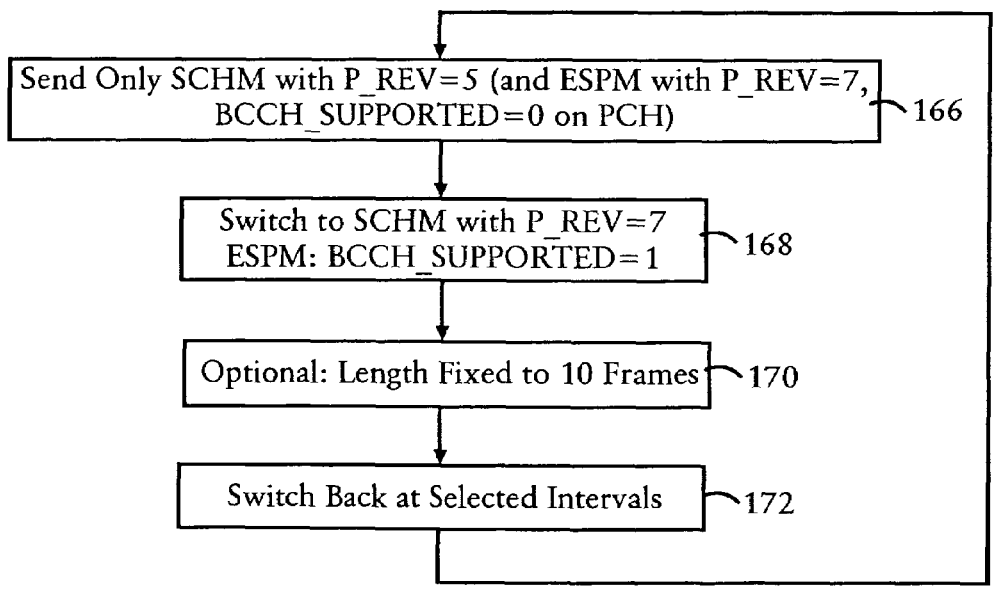
FIG. 6 is a diagram illustrating an alternative method by the Base Station of FIG. 4 sending multiple protocol identifiers according to one embodiment of the present invention.

FIG. 6 is a diagram illustrating the second proposed solution of the disclosed embodiment, In particular, the IS-2000 Rev. A BS 140 is configured for alternating between transmitting the SCHM having the P_REV value set to P_REV=5 in step 166 (equivalent to steps 160, 162, and 164 of FIG. 5), and the P_REV set to P_REV=7 in step 168. This second proposed solution is particularly effective in the IS-2000 Rev. A system 140 where IS95 problem MSs 142 and IS-2000 Rev. A MSs 144 co-exist within the same system. The ratio between sending the SCHM with P_REV=7 and P_REV=5 can be varied in step 172 for the MSs to optimally get the relevant SCHM. The BS shall set the P_REV to 7 and BCCH_SUPPORTED to '1' in the Extended System Parameters Message (ESPM) that is sent on PCH in step 168. The BCCH_SUPPORTED field, when it is set to '1', indicates that the BS supports the BCCH and directs the MS to stop monitoring Paging Channel and go to System Determination Substate to get the information on BCCH from SCHM. By doing this, both the problem IS-95 MSs and IS-2000 Rev. A MSs can work well.

The procedure of problem IS-95 MSs 142 is illustrated in FIG. 7. For the problem IS-95 MSs 142, when they get the SCHM in step 701 and if it has P_REV set to 5 they will have no problem in getting the SCHM and the PCH in step 704. After getting the PCH, they will go to Idle State in step 705. If in step 702 the MS 142 determines that it received the SCHM with P_REV set to 7 first, then they cannot decode the SCHM and will go to the System Determination Substate in step 703.

FIG. 8 illustrates the procedure of IS-2000 Rev. A MSs 144 and 146 responding to the messages output by the BS 140 according to the method of FIG. 6. After the system determination substate in step 800, if the IS-2000 Rev. A MSs 144 determines in step 802 that it has received the SCHM with P_REV set to 5, will decode in step 807 the PCH as if it was currently in the IS-95B systems. After decoding the PCH in step 807, the MS 144 will obtain the true P_REV set to 7 from the ESPM in step 808; if the MS 144 determines in step 810 that the BCCH_SUPPORTED field is set to 1, the MS will conclude it is in the IS-2000 Rev. A systems. Hence, the MS 144 will go to System Determination Substate in step 811 as specified in the IS-2000 Rev. A specification.

If in step 802 the MS 144 or 146 receives the SCHM with P_REV set to 7 first, the MSs 144 or 146 will receive overhead messages from the BCCH in step 806, followed by the Idle State 809.

The third proposed solution is similar to the second proposed solution in that the IS-2000 Rev. A BS 140 alternates the SCHM with P_REV set to 5 and P_REV set to 7, as illustrated in FIG. 6. The ratio between P_REV 7 and P_REV 5 SCHM can also be varied to enable the MSs 142, 144, and 146 to optimally obtain the relevant SCHM using the respective acquisition techniques described in FIGS. 7 and 8. In this case, however, the BS shall set BCCH_SUPPORTED to 0 in the ESPM.

The procedure acquiring the SCHM by the problem IS95 MSs 142 is illustrated in FIG. 7. In response to the problem IS-95 MSs 142 obtaining the SCHM in step 701, if in step 702 the P_REV is set to P_REV=5, the MSs 142 can obtain the SCHM and the PCH without difficulty in step 704. Once the PCH is obtained, the MSs 142 will enter into Idle State in step 705. If in step 702 the SCHM has the P_REV set to P_REV=7, the MS 142 determines in step 703 that it cannot decode the SCHM and goes to the System Determination Substate in step 703.

As illustrated in FIG. 8, the IS-2000 Rev. A MSs 144 or 146 will operate in the IS-95 mode in response to first receiving the SCHM with P_REV set to 5, instead of entering the System Determination Substate. After the system determination substate in step 800, if the IS-2000 Rev. A MS 144 first obtains in step 801 the SCHM with P_REV set to 5 as determined in step 802, it will operate is if they are in the IS95-B systems and will decode the PCH in step 807. But after decoding the PCH, it will get the true P_REV set to 7 in step 808 and determine in step 810 that BCCH_SUPPORTED is set to 0 from the ESPM, indicating to the MS 144 that the IS-2000 Rev. A system 140 does not support the BCCH; hence, the MS 144 will enter the Idle State in step 809. Otherwise, if the MSs first obtain in step 802 the SCHM with P_REV set to 7 first, they will receive overhead messages from the BCCH in step 806, and then enter Idle State in step 809. By doing this, the delay caused to the IS-2000 Rev. A MSs may be mitigated compared to the second solution because they will not go to System Determination Substate when they get the SCHM with P_REV set to 5 but get PCH and go to Idle State. But in this case, the IS-2000 Rev. A MSs cannot take advantage of the BCCH.

Some additional enhancements are also proposed, which can be combined with the three proposals mentioned above. Since the problem Nokia MSs (610) will work well with SCHM of which the length is (3n+1) frames, one enhancement would be forcing the SCHM in step 170 of FIG. 6 with P_REV set to 7 to have 10 frames length by padding will make problem Nokia MSs always work well with P_REV 7 SCHM. A second enhancement can be combined with proposal 2 to mitigate the delay by preventing the IS-2000 Rev. A MSs from going to System Determination State frequently. The IS-2000 Rev. A MSs can be made smart enough that they will wait until they gets SCHM with P_REV set to 7 when they are directed to go to System Determination Substate by the BCCH_SUPPORTED field set to 1 in the ESPM but got SCHM with P_REV=5. The MS can use two stored values, BCCH_SUPPORTEDs and P_REVs. When BCCH_SUPPORTEDs=1 and P_REVs=7, the MS can notice that the System is sending SCHM with P_REV=5 and SCHM with P_REV=7 alternately.

The procedure of the Smart IS-2000 Rev. A MS 146 can be found in FIG. 8. When the IS-2000 Rev. A MSs get SCHM with P_REV set to 5 in step 602 and then gets P_REV set to 7 and BCCH_SUPPORTED to 1 from ESPM in step 804, they will remain in the Sync Channel Acquisition Substate in step 805 until they get the SCHM with P_REV set to 7.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a base station of synchronizing a mobile station configured for receiving a sync channel message via a sync channel, the method comprising:

first sending by the base station on the sync channel a first sync channel message specifying a first protocol of P_REV 5, the first sync channel message enabling synchronization to the base station by a first mobile station that requires a sync channel size of an IS-95B sync channel message;

second sending, by the base station on a paging channel according to IS-2000 Rev. A, an extended system parameters message (ESPM) specifying availability of a second sync channel message utilizing a second protocol of P_REV 7, the extended system parameters message further specifying a broadcast control channel supported (BCCH_SUPPORTED) field, the extended system parameters message enabling a second mobile station, having synchronized to the base station according to the first protocol in response to the first sync channel message, to identify the availability of the second protocol as an alternative to the first protocol; and third sending by the base station on the sync channel second sync channel message specifying the second protocol of P_REV 7, enabling the second mobile station to change synchronization with the base station from the first protocol to the second protocol based on decoding the second sync channel message.

2. The method of claim 1, wherein the selectively sending includes alternating between the first sync channel message and the second sync channel message according to a selected ratio.

3. The method of claim 1, further comprising setting the BCCH_SUPPORTED field in the extended systems parameters message to cause the second mobile station, configured for execution according to the second protocol and having detected the first protocol being P_REV 5, to enter a system determination substate.

4. The method of claim 1, further including setting a BCCH_SUPPORTED field in the extended systems parameters message to zero.

5. A method in a mobile station of synchronizing with a base station, the method comprising:

receiving by the mobile station via the sync channel a first sync channel message specifying a first protocol of P_REV 5, and in response synchronizing with the base station based on the first sync channel message, the first sync channel message enabling synchronization to the base station by any given mobile station that requires a sync channel size of an IS-95B sync channel message;

detecting by the mobile station, on a paging channel according to IS-2000 Rev. A, an extended system parameters message (ESPM) specifying an availability of a second sync channel message utilizing a second protocol of P_REV 7, the extended system parameters message further specifying a broadcast control channel supported (BCCH_SUPPORTED) field, the mobile station identifying the availability of the second protocol as an alternative to the first protocol from the extended system parameters message;

the mobile station determining whether the second sync channel message specifying the second protocol of P_REV 7 is detected on the sync channel; and the mobile station selectively changing synchronization with the base station from the first protocol to the second protocol in response to detecting the second sync channel message.

6. The method of claim 5, wherein the mobile station is configured for returning to a system determination substate, based on the first sync channel message specifying the first protocol to be P_REV 5 and extended system parameters message including a BCCH_SUPPORTED field indicating the presence of a broadcast control channel.

7. A method in a mobile station of synchronizing with a base station, the method comprising:

synchronizing, by the mobile station in a system determination state, with the base station in response to receiving a sync channel message on a sync channel;

the mobile station determining whether the sync channel message follows one of a first protocol specifying a first protocol of P_REV 5 and enabling synchronization to the base station by any given mobile station that requires a sync channel size of an IS-95B sync channel message, or a second protocol of P_REV 7;

selectively triggering the mobile station to repeat the synchronizing step in the system determination state based on determining that the sync channel message follows the first protocol, and in response to the mobile station receiving on a paging channel according to IS-2000 Rev. A, an extended system parameters message specifying availability of a sync channel message utilizing the second protocol, and further in response to the extended system parameters message specifying a broadcast control channel supported (BCCH_SUPPORTED) field set to identify a broadcast control channel; and the mobile station continuing to an idle state, configured for enabling user communications, based on determining that the sync channel message follows the second protocol.

8. The method of claim 7, wherein the first protocol is a P_REV 5 protocol and corresponds to the sync channel message having a length of 27 octets, and the second protocol is a P_REV 7 protocol and corresponds to the sync channel message having a length exceeding 27 octets.

9. The method of claim 8, wherein the second protocol corresponds to the sync channel message having a length of 40 octets and including ten (10) 26.66 ms frames.

10. The method of claim 9, wherein the mobile station is configured for executing a Go-direct-to-idle resource for maintaining an idle state upon determining a system configuration from the sync channel message, the method further comprising preventing return to the system determination state based on the determined availability of the system configuration.

11. The method of claim 1, wherein the first sync channel message has a size of 27 octets.

12. The method of claim 5, wherein the first sync channel message has a size of 27 octets.

* * * * *